(12) United States Patent
Ebert et al.

(10) Patent No.: US 7,328,765 B2
(45) Date of Patent: Feb. 12, 2008

(54) SNOWMOBILE TUNNEL AND REAR HEAT EXCHANGER (75) Inventors: Russ Ebert, Lakeshore, MN (US); Ken Fredrickson, Thief River Falls, MN (US); Ron Bergman, McIntosh, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 60 days.

(21) Appl. No.: 10/953,940

(22) Filed: Sep. 29, 2004

(65) Prior Publication Data

US 2005/0040707 A1 Feb. 24, 2005

Related U.S. Application Data (63) Continuation of application No. 10/290,846, filed on Nov. 7, 2002, now abandoned.

(51) Int. Cl.
*B62M 27/02* (2006.01)

(52) U.S. Cl. .................................... 180/190; 180/186

(58) Field of Classification Search ............. 180/186, 180/190, 183, 192, 182; 296/25; 280/847; 305/185
See application file for complete search history.

(56) References Cited

U.S. PATENT DOCUMENTS

| | | | |
|---|---|---|---|
| 5,232,066 A | | 8/1993 | Schnelker |
| D362,207 S | * | 9/1995 | Hacke et al. .............. D12/7 |
| 5,568,840 A | * | 10/1996 | Nagata et al. ............. 180/190 |
| 6,109,217 A | | 8/2000 | Hedlund et al. |
| 6,491,125 B2 | | 12/2002 | Girouard et al. |
| 6,604,594 B2 | | 8/2003 | Wubbolts et al. |
| 6,651,764 B2 | * | 11/2003 | Fournier et al. ........... 180/190 |
| 6,672,602 B2 | * | 1/2004 | Way et al. ................ 280/87.01 |
| D488,096 S | * | 4/2004 | Cadotte et al. .............. D12/7 |
| 6,749,036 B1 | * | 6/2004 | Schrapp et al. ............ 180/190 |
| 6,802,383 B2 | * | 10/2004 | Nishijima .................. 180/190 |
| 6,808,034 B2 | * | 10/2004 | Nakano et al. ............ 180/190 |
| 6,840,344 B2 | * | 1/2005 | Galbraith et al. ........... 180/219 |
| 7,063,178 B2 | * | 6/2006 | Etou ......................... 180/190 |
| 2004/0090119 A1 | * | 5/2004 | Ebert et al. ................ 305/185 |

* cited by examiner

*Primary Examiner*—Jason R. Bellinger
(74) *Attorney, Agent, or Firm*—Black Lowe & Graham, PLLC (57) ABSTRACT The top wall of a snowmobile tunnel, which accommodates the endless drive track of the snowmobile, is provided with recesses at locations corresponding to the path followed by studs carried by the endless track. In another aspect of the invention, the rear of the tunnel is connected to a molded rear member. The rear member provides a downwardly curving back portion for the tunnel. The rear member may have a shape corresponding to that of the tunnel, e.g. having a pattern of recesses matching that of the top wall of the tunnel. In yet another aspect of the invention, a heat exchanger for cooling engine coolant may be provided at the rear of the tunnel. The heat exchanger may be mounted to and partially spaced from the molded rear member, thereby permitting snow thrown by the endless track to pass on both sides of the heat exchanger. In another aspect of the invention, a tunnel for a snowmobile may be narrower in the front than in the rear.

13 Claims, 9 Drawing Sheets

SNOWMOBILE TUNNEL AND REAR HEAT EXCHANGER

BACKGROUND OF THE INVENTION

The present invention relates to a tunnel structure and rear heat exchanger for a snowmobile. The driving system for a snowmobile, e.g. an endless track, is accommodated within a structure known as a tunnel, which has a top wall and side walls. Endless tracks for snowmobiles often are provided with longitudinal rows of studs that protrude from the surface of the endless track and provide improved traction. In order to prevent damage to the snowmobile from the studs, sufficient clearance needs to be provided.

In addition, snowmobiles often are powered by liquid cooled engines. It would be desirable to improve the cooling capacity of the cooling system for a snowmobile engine.

SUMMARY OF THE INVENTION

In accordance with one aspect of this invention, the top wall of the snowmobile tunnel accommodating the endless drive track is provided with recesses at locations corresponding to the path followed by the studs. The recesses can extend the length of the tunnel.

In another aspect of the invention, the rear of the tunnel is connected to a molded rear member. The rear member provides a downwardly curving back portion for the tunnel. The rear member may have a shape corresponding to that of the tunnel, e.g. having a pattern of recesses matching that of the top wall of the tunnel.

In yet another aspect of the invention, a heat exchanger may be provided at the rear of the tunnel. The heat exchanger functions to cool coolant fluid from the engine of the snowmobile. The heat exchanger may be mounted to the molded rear member.

In yet another aspect of the invention, the tunnel of the snowmobile is narrower at the front than at the back, providing a more comfortable seating position at the front of the tunnel while still providing adequate clearance for more sideways movement of the endless track at the rear of the snowmobile.

DETAILED DESCRIPTION

Figure 1:
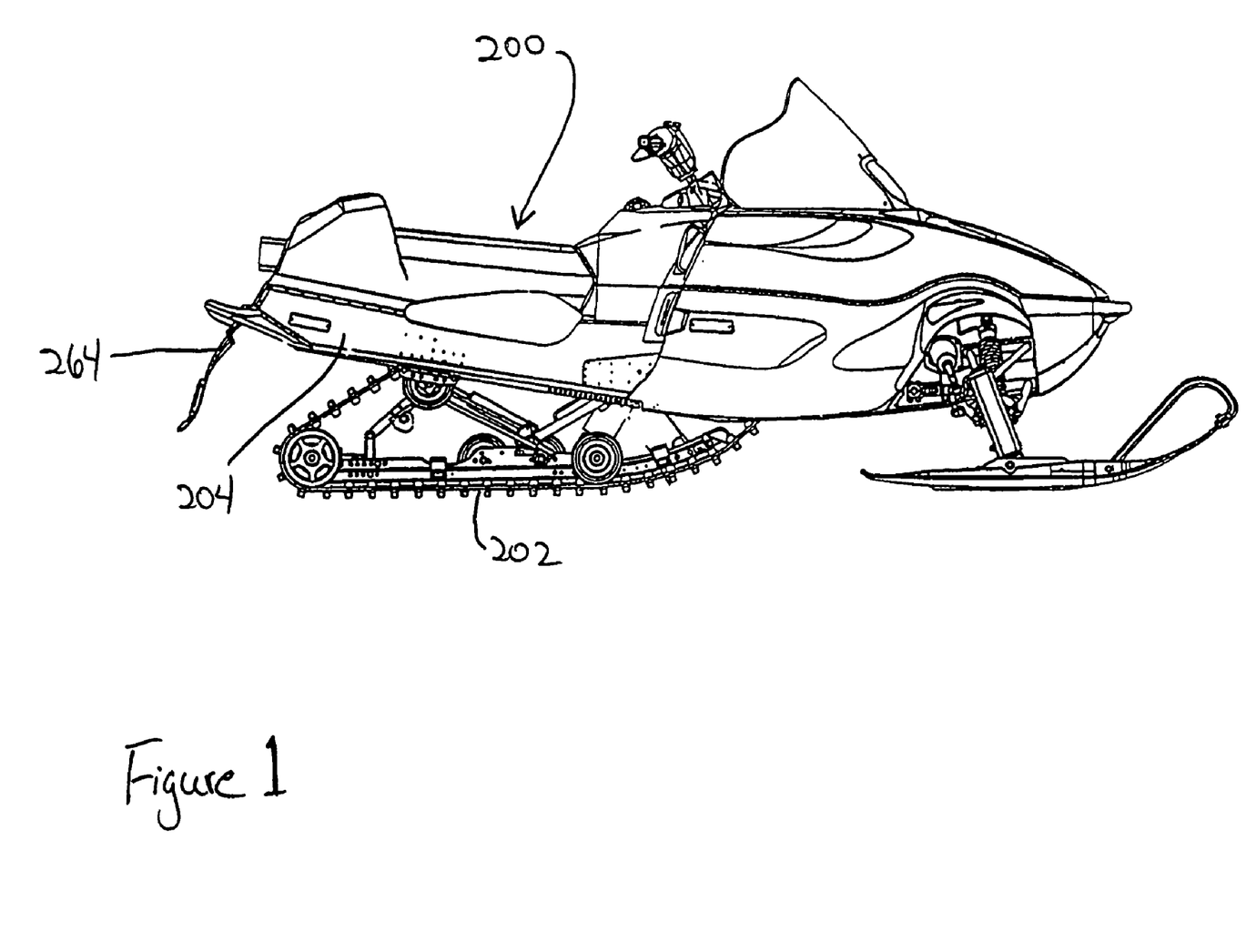
FIG. 1 is a side view of a snowmobile of the present invention.
Figure 2:
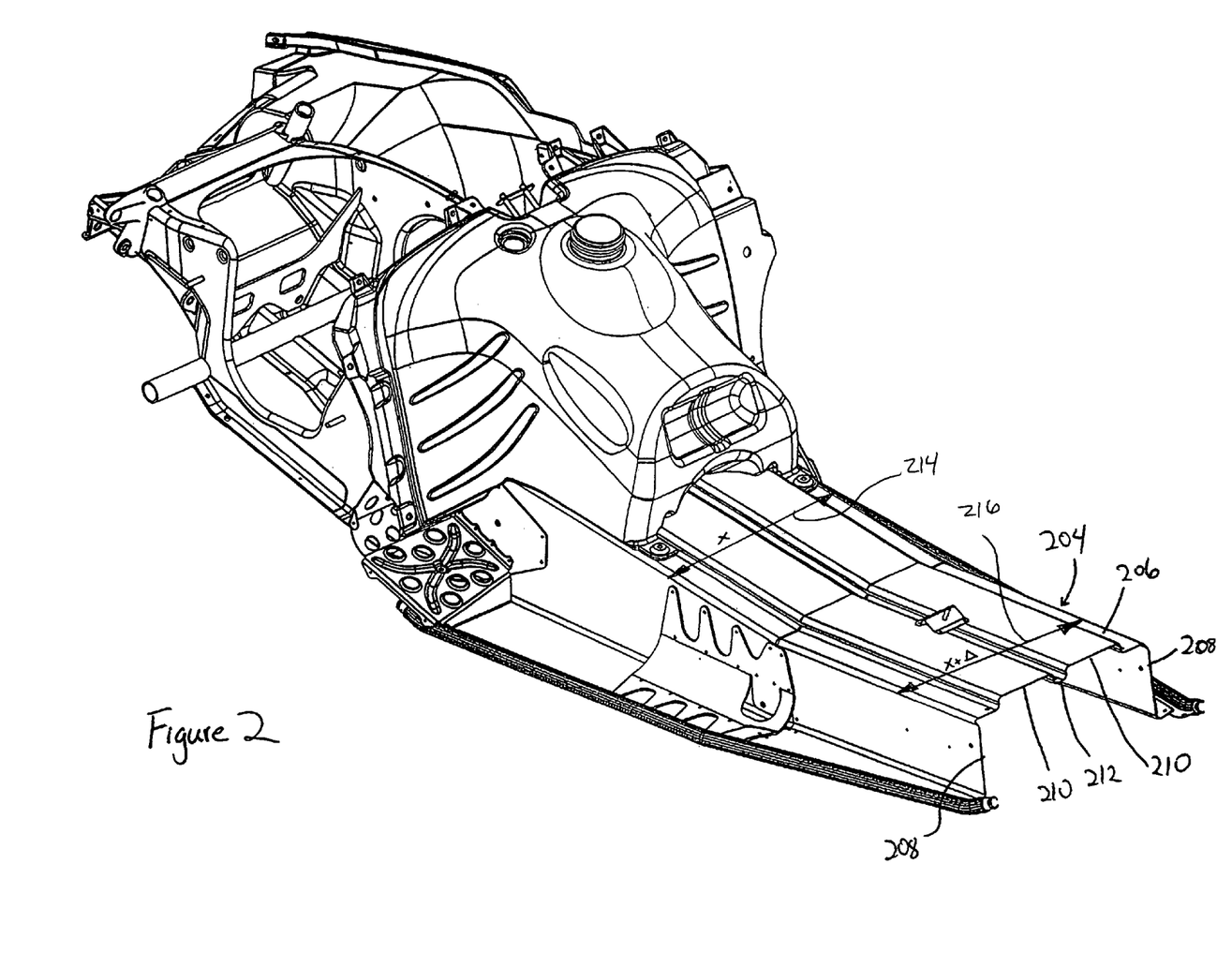
FIG. 2 is a perspective view showing the tunnel of a snowmobile of the present invention from the rear of the tunnel.
Figure 3:
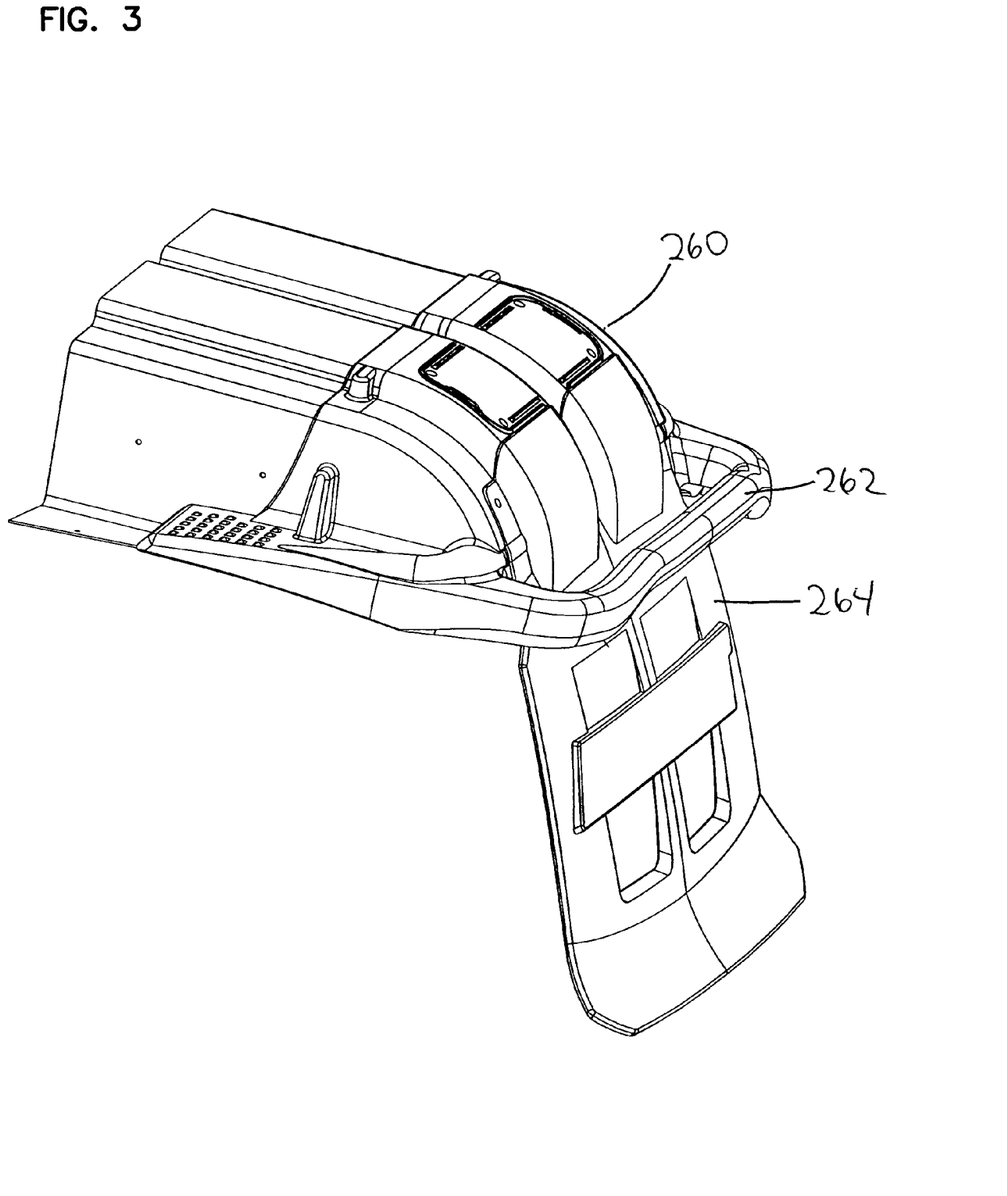
FIG. 3 is a perspective view of a molded rear member secured to the tunnel of a snowmobile of the present invention.

Referring to FIGS. 1 and 2, a snowmobile 200 is driven by endless track 202. The endless track 202 is accommodated in a tunnel structure 204. The tunnel has a top wall 206 and sidewalls 208. The top wall of the tunnel is provided with recesses 210 at locations corresponding to the path followed by the studs provided on the endless track. The recesses can extend the length of the tunnel, or can be terminated outside of portions of the tunnel where the clearance with studs carried by the endless track is not an issue.

Preferably, the recesses are at least two in number, with at least one rib member 212 between the recesses. This structure helps to strengthen the tunnel. Also, the tunnel preferably has a substantially uniform wall thickness. That is, the recesses have substantially the same wall thickness as the other parts of the top wall of the tunnel and the sidewalls.

The recesses have a width and spacing corresponding to the stud pattern on the endless track. In a typical example, the recesses may be about 4 to 5 inches wide (about 10-13 cm), for example about 4.5 inches wide (11.5 cm). The depth of the recesses will depend on the studs that are to be used. Typically the depth will be about 0.5 to 1 inch (1.3 to 2.5 cm), for example about three fourths of an inch (2 cm).

The tunnel can be made out of any suitable material, for example a metal such as aluminum. The tunnel can be formed by any suitable method, including pressing, bending or extruding.

The tunnel may be flared from front to back. At the front of the snowmobile, the position of the endless track and its associated components can be controlled more closely, permitting narrowing of the tunnel, particularly the top of the tunnel, at the front to increase rider comfort. At the same time, the increased width of the tunnel at the rear of the snowmobile can provide the desired clearance for the looser tolerance that may be present at the rear of the drive track. The width 214 at the front of the tunnel may be equal to a value x, whereas the width 216 at the rear of the tunnel has a value x+Δ. For example in one embodiment, the front of the tunnel top may have a width 214 that is about 0.5 to 1.5 inches (1.3 to 3.8 cm) narrower than the width 216 at the rear of the tunnel, for example about 1 inch (2.5 cm), and taper may be uniform from front to back. If the top and bottom of the tunnel are not the same width at a given location along the length of the tunnel, the width may vary gradually from top to bottom.

Referring to FIGS. 3-6, the rear of the snowmobile may include a rear molded member 260 at the rear of the tunnel. The rear molded member may be made of any suitable plastic material, for example high density polyethylene or other suitable resin, and can be formed by a suitable molding process, for example a process in which the product is created by the setting of a softened or molten material that has been formed into a desired configuration. The plastic material can be filled with glass fiber or other fillers to provide desirable properties. The rear molded member can provide a bumper for the snowmobile, as illustrated by element 262. The rear member may be secured to the tunnel in any suitable way, including, for example, fasteners such as screws, adhesives, mechanical engagement, hook and loop fasteners, press fitting or friction fitting. In one embodiment, the forward edge of the rear molded member defines a lip that overlaps the inside or outside of the tunnel so that a fastener such as a screw may be passed through both, thereby facilitating the connection between the tunnel and the rear molded member.

The rear member may be adapted for mounting of a flap 264 that reduces the chances of snow and other debris being thrown from the underside of the snowmobile. The flap can be mounted in any suitable way, including, for example, fasteners such as screws, adhesives, heat or solvent welding, mechanical engagement, and hook and loop fasteners. The rear molded member can be adapted for mounting of lights, reflectors, etc. as desired or needed for compliance with governmental regulations.

In a preferred embodiment, the rear molded member curves downwardly toward the rear of the snowmobile and has a recess structure corresponding to that of the top of the tunnel. This structure is particularly useful in combination with a rear heat exchanger 266. Coolant is delivered to this rear heat exchanger, for example, through a coolant passage that extends along one side of the snowmobile (see FIG. 2), and is returned to the engine through a coolant passage that extends along the other side of the snowmobile. The coolant passages and the rear heat exchanger are connected with suitable pipes or hoses. In one embodiment, these connections pass underneath the rear molded member, although it would be possible to arrange for the connections to pass through the sidewall of the rear molded member instead.

Figure 4:
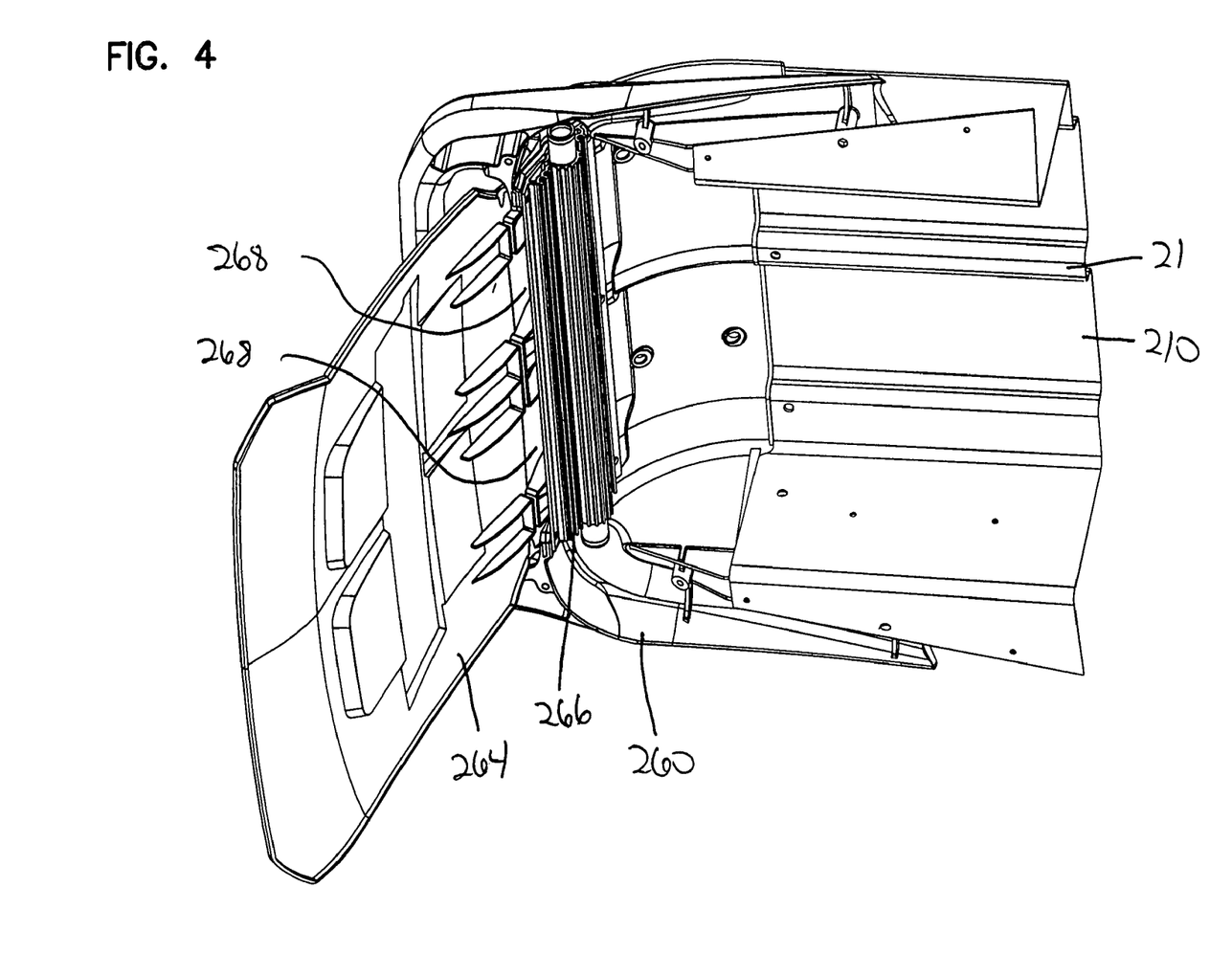
FIGS. 4 and 7 are views of the molded rear member from the bottom, showing a heat exchanger for cooling fluid from the snowmobile engine.
Figure 5:
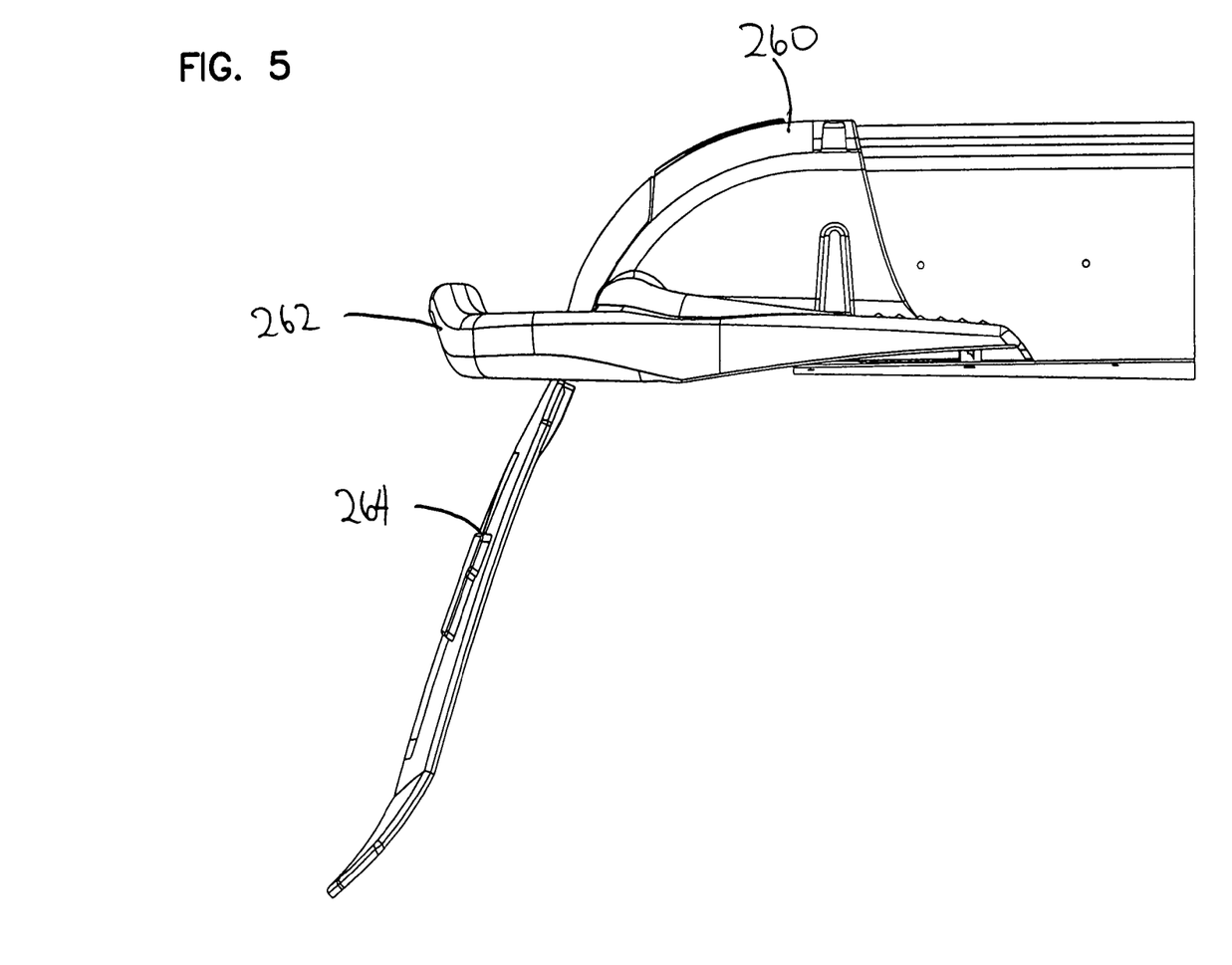
FIG. 5 is a side view of the molded rear member.
Figure 6:
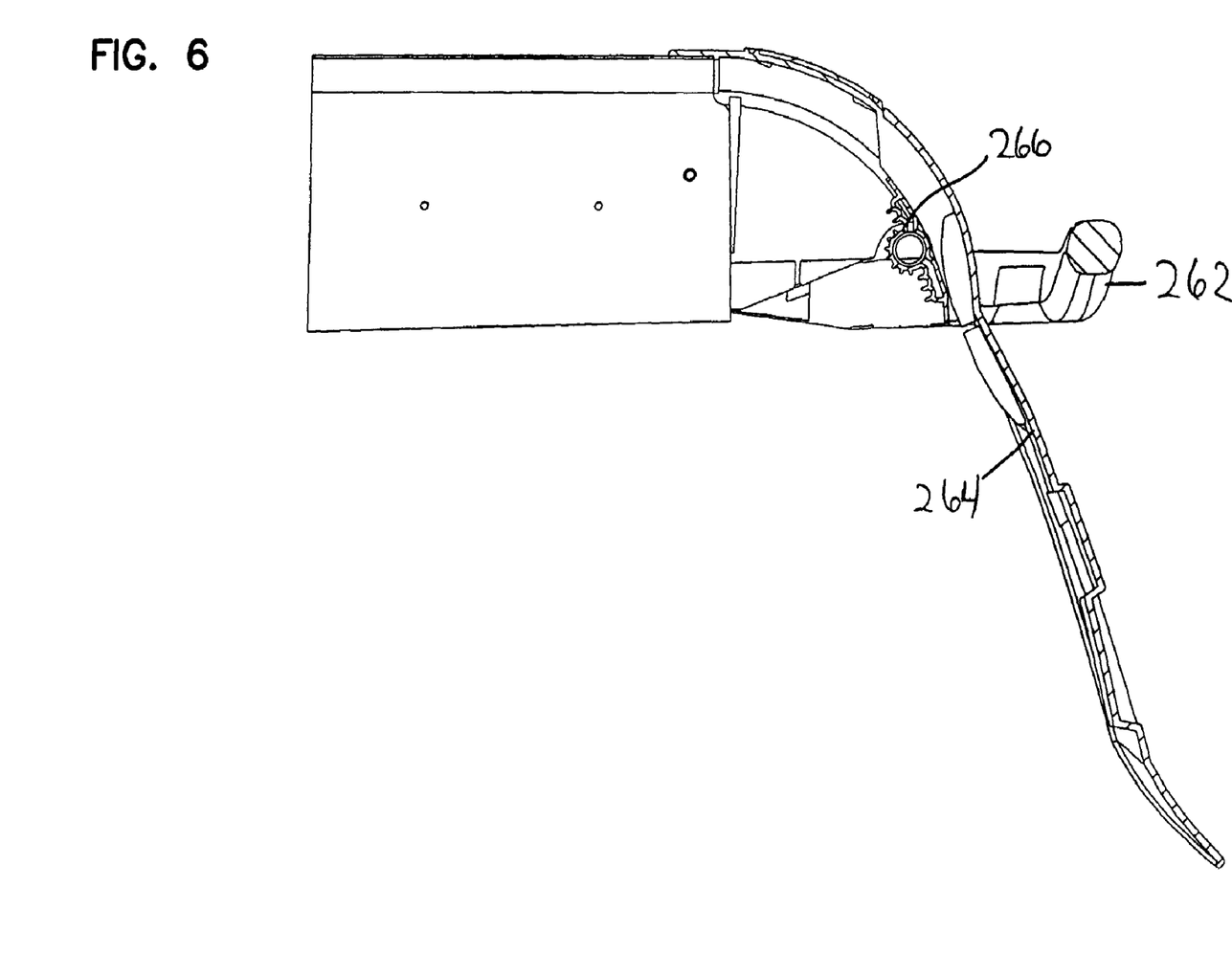
FIG. 6 is a sectional side view of the molded rear member.

The heat exchanger preferably is mounted to be spaced somewhat from the rear member, for example at a surface of the rear member that has recesses corresponding to those of the top wall. Thus, the heat exchanger may be supported at the edges and center of the rear molded member, but spaced from the rear molded member by the recesses. See the spaces identified as 268. Snow thrown by the endless track will impact the inward-facing surface of the heat exchanger, and this arrangement also makes it possible for snow to pass behind the heat changer as well. This increases the cooling ability of the heat exchanger. The heat exchanger may be mounted to the rear molded member, for example with a fastener such as a screw or other means.

Figure 7:
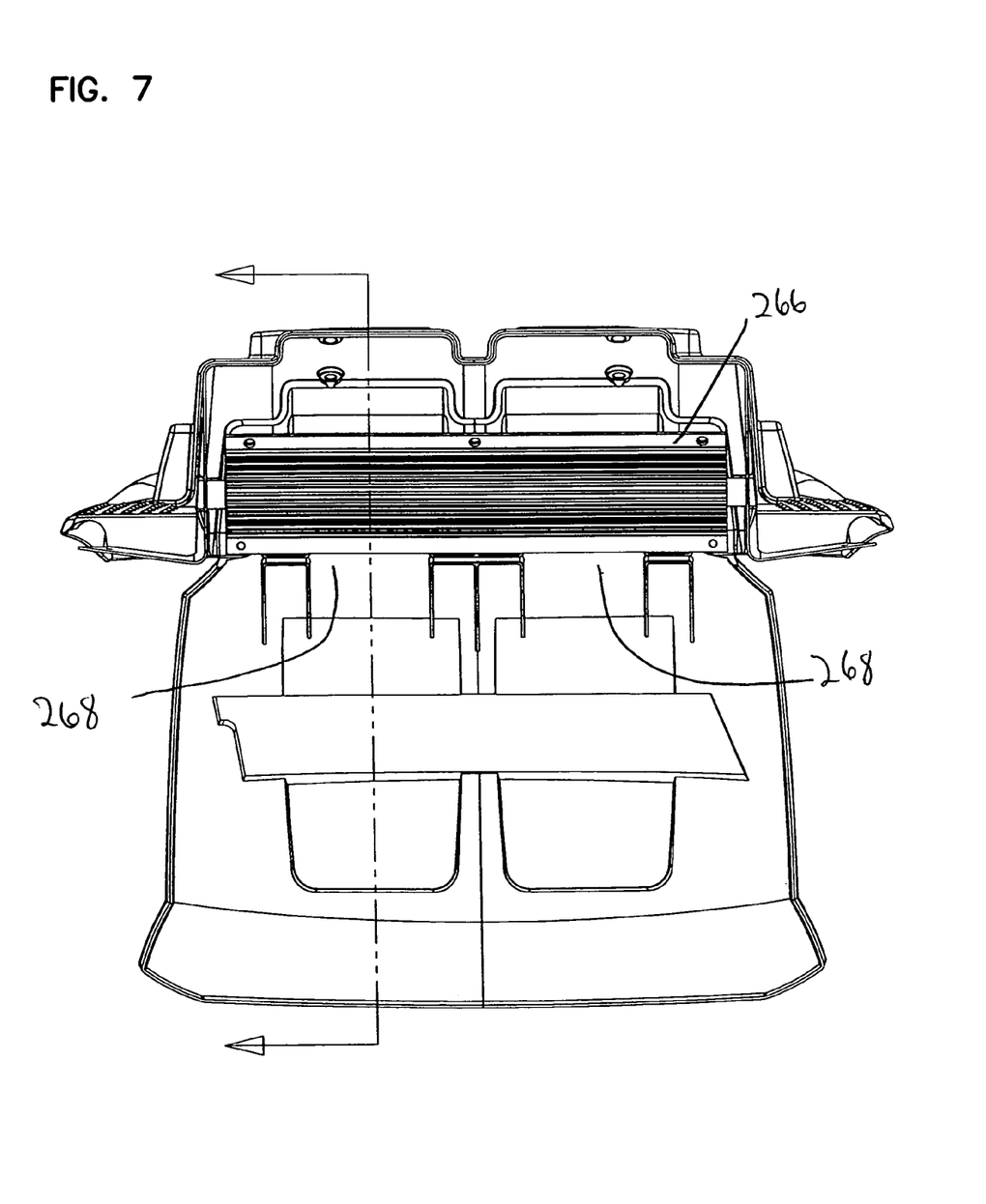
Figure 8:
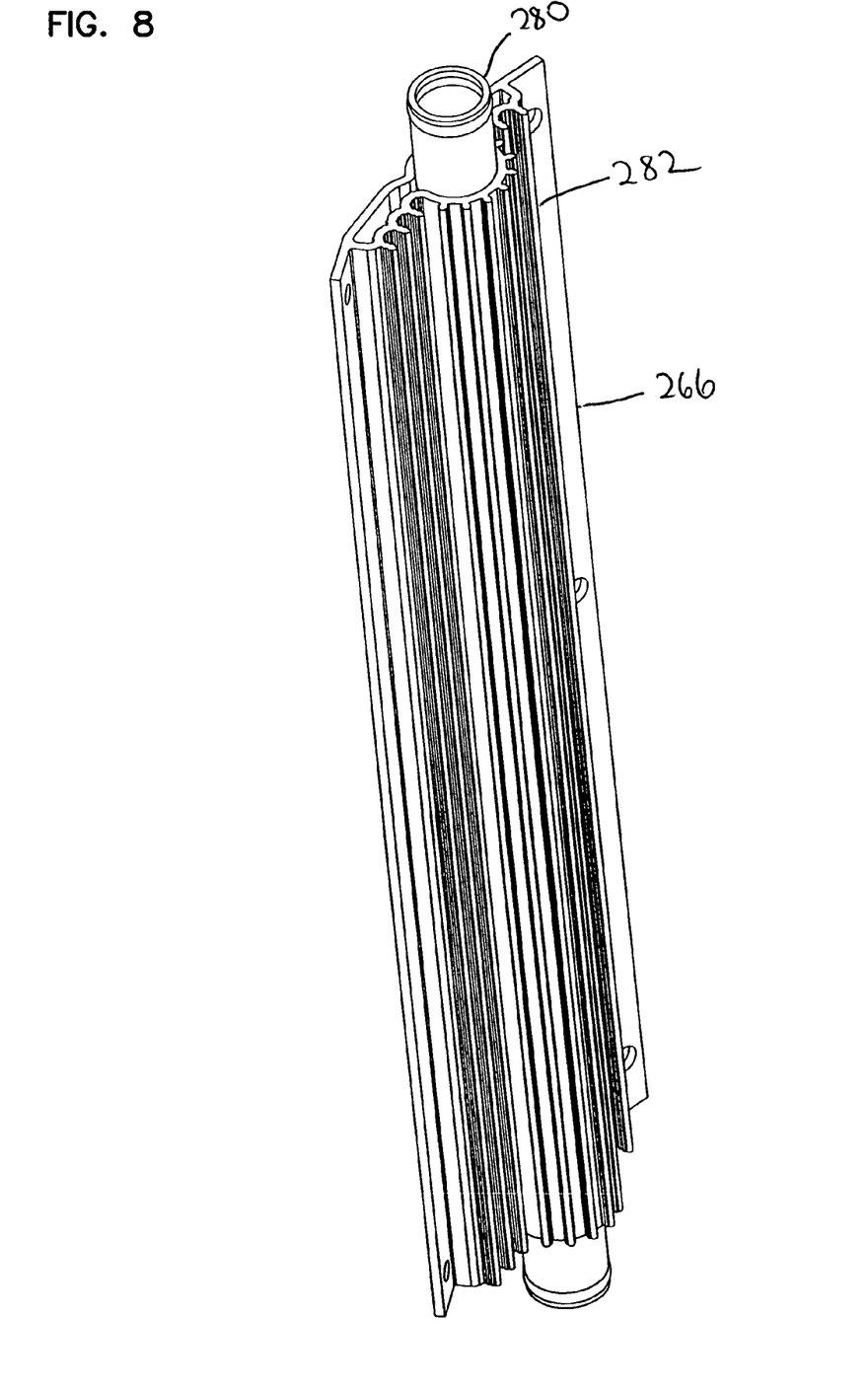
FIG. 8 is a perspective view of a heat exchanger that can be used with the present invention.

The heat exchanger may have a configuration shown in FIG. 8. In one embodiment, the heat exchanger may include a coolant tube 280 and a heat dissipating plate 282 secured to the coolant tube, e.g. by welding or other suitable methods. As seen in FIGS. 7 and 8, the inward face of the heat exchanger (facing the endless track) may be provided with ribs that increase the effective surface area of the coolant tube and/or heat dissipating plate, thereby increasing the cooling ability of the heat exchanger. The outward face (facing the wall of the rear molded member or tunnel) has a relatively smooth shape, facilitating the passage of snow behind the heat exchanger.

In the illustrated embodiment, the heat dissipating plate is formed by extrusion, and the coolant tube passes through the extrusion. In this case, the ends of the extrusion may be left open as illustrated. It also is possible to close the ends of the extrusion, and replace the coolant pipe with a pair of spigots, one at each end of the extrusion, for delivering coolant to and carrying coolant from the interior of the extrusion. This allows coolant to be exposed to more of the interior of the heat dissipating plate, and can increase the effective cooling capacity of the heat exchanger. In this case, the extrusion can be closed by any suitable method, such as welding or use of a sealing member.

Figure 9:
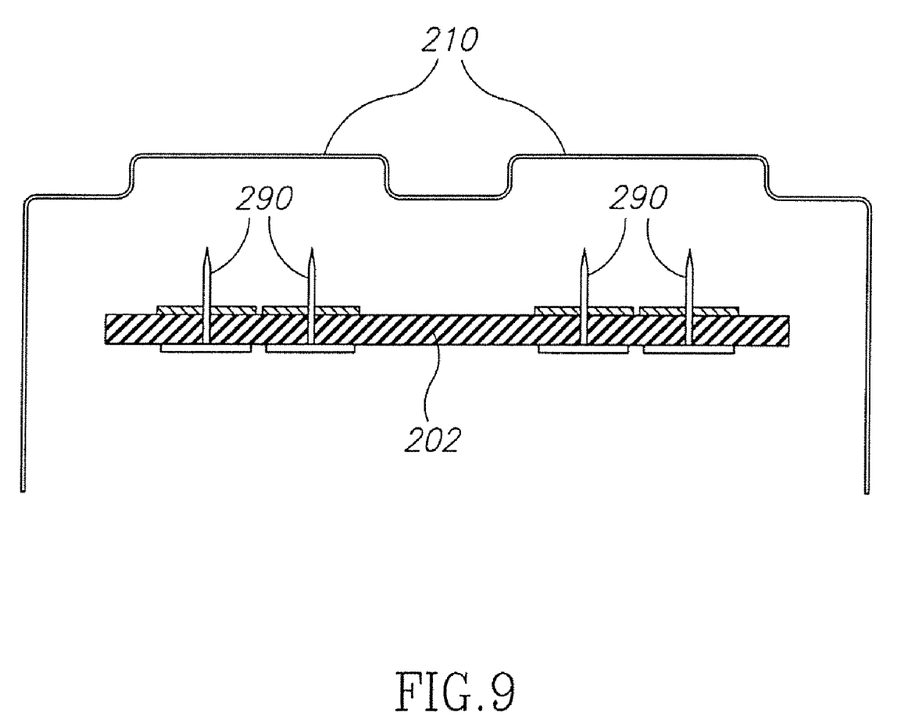
FIG. 9 is a cross-sectional view of the tunnel and track.

Referring to FIG. 9, the top wall of the tunnel is provided with recesses 210 at locations corresponding to the path followed by the studs 290. The recesses 210 have a width and spacing corresponding to the stud pattern on the endless track 202. The depth of the recesses 210 are sized to accommodate the studs 290 that are typically used.

While a detailed description of the present invention has been provided above, the invention is not limited thereto, and modifications will be apparent. The invention is defined by the claims that follow.

What is claimed is:

1. A snowmobile comprising:
   an endless track having a plurality of traction members projecting therefrom;
   a tunnel having a top wall coupled to two sides, the top wall having an upper surface and a lower surface, the lower surface configured to define at least one recessed channel extending lengthwise along the tunnel and proximate a path followed by at least one of the traction members, wherein the recessed channel includes a first depth region sufficient to receive the traction members at least intermittently during operation of the snowmobile such that the lower surface of the tunnel adjacent the first depth region maintains clearance with the traction members.

2. The snowmobile of claim 1, wherein the lower surface of the top wall defines at least two recessed portions, wherein both recessed portions are configured to receive the traction members.

3. The snowmobile of claim 1, wherein the top wall of the tunnel includes a uniform wall thickness.

4. The snowmobile of claim 1, further comprising a rear molded member coupled to the tunnel.

5. The snowmobile of claim 4, wherein the rear molded member is further configured as a rear bumper.

6. The snowmobile of claim 4, further comprising a flap mounted to the rear molded member.

7. A snowmobile comprising:
   an endless track having a plurality of traction members projecting therefrom;
   a tunnel for accommodating the endless track, the tunnel having a top coupled to two sides, wherein the top of the tunnel is provided with at least one recess at a location corresponding to a path followed by at least one of the traction members; and
   a rear molded member at the rear of the tunnel, wherein the rear molded member curves downward relative to the rear of the tunnel and is formed with a recess corresponding to the recess of the top of the tunnel.

8. The snowmobile of claim 1, further comprising a heat exchanger coupled to at least the tunnel or a rear molded member positioned at a rear of the tunnel, the heat exchanger located approximately at the rear of the snowmobile and at least partially spaced from the rear molded member.

9. The snowmobile of claim 8, wherein the heat exchanger is coupled to and spans a recess formed in the rear molded member.

10. A snowmobile, comprising:
    an endless drive track;
    a tunnel for accommodating the endless drive track;
    a rear molded member at the rear of the tunnel having a recess formed therein; and
    a heat exchanger mounted to the rear molded member positioned to span the recess, wherein the rear molded member curves downward relative to the rear of the tunnel.

11. The snowmobile of claim 10, wherein the rear molded member comprises a rear bumper.

12. The snowmobile of claim 10, further comprising a flap mounted to the rear molded member.

13. A snowmobile comprising:
    an endless track having a plurality of traction members projecting therefrom;
    a tunnel shaped to accommodate the endless track of the snowmobile, the tunnel including a top wall and side members, the top wall of the tunnel includes at least two recessed portions separated by a rib member, each recessed portion includes a sufficient amount of clearance to permit the traction members of the endless track to successively move relative to the top wall while maintaining an amount of clearance spacing between the traction members and the top wall of the tunnel during snowmobile operation; and a molded member positioned toward a rear of the tunnel and coupled to the tunnel, the molded member curving downwardly relative to the rear of the tunnel and having two recessed portions that correspond and cooperate with the recessed portions of the tunnel.

\* \* \* \* \*